United States Patent Office 3,414,375
Patented Dec. 3, 1968

3,414,375
TWO-STAGE PROCESS FOR THE PREPARATION OF POTASSIUM METAPHOSPHATE
Alphonse Leroy and Ludovic Gijsemans, Tessenderlo, and Fernand Peerts, Heverle, Belgium, and Georges Hulot, Paris, Jean Martin, Ermont, and Jean René Andrieu, Villiers-le-Bel, France, assignors of fifty percent each to Produits Chimiques du Limbourg, Brussels, Belgium, and Societe d'Etudes Chimiques pour l'Industrie et l'Agriculture, Paris, France
No Drawing. Filed July 20, 1964, Ser. No. 383,990
Claims priority, application France, Aug. 7, 1963, 944,030, Patent 1,377,348
21 Claims. (Cl. 23—106)

ABSTRACT OF THE DISCLOSURE

Producing potassium metaphosphate by the successive steps of:
(a) Partially reacting phosphoric acid and potassium chloride at about 120–300° C.; and
(b) Rapidly increasing the temperature of the resultant reaction mass from step (a) to about 560–850° C. to obtain additional potassium metaphosphate, said rapid temperature increase being at a sufficiently high rate to substantially obviate any formation of a pasty, sticky phase.

---

This invention relates to an improved process for the preparation of potassium metaphosphate from phosphoric acid and potassium chloride.

The formation of metaphosphate by reacting phosphoric acid and potassium chloride is well known and has been studied within a wide temperature range of from 200° C. to more than 1000° C. When equimolar proportions of acid and chloride are used, the reaction can be represented by the following simplied equation:

$$H_3PO_4 + KCl = KPO_3 + HCl + H_2O$$

Actually, this reaction does not yield a monomeric metaphosphate $KPO_3$, but a polyphosphate $(KPO_3)_n$ in which the degree of polymerization $n$ varies according to operating conditions, values of $n$ being reported as low as 2 and as high as 20,000. Hereinafter, the word "metaphosphate" is used for purposes of simplicity, it being understood that this salt is always obtained in a more or less polymerized form.

Potassium metaphosphate is a binary fertilizer of special value owing to its very high content of nutritive elements available for plants: 60.1% $P_2O_5$ and 39.9% $K_2O$ for the pure product. Moreover, because of its low hygroscopicity, potassium metaphosphate has the outstanding advantage of not caking and of remaining free-flowing even under severe climatic conditions; thus, it can be readily handled and stored.

Many processes at various temperatures have been proposed for the manufacture of potassium metaphosphate from phosphoric acid and potassium chloride.

When working with moderate temperatures, for example, a pasty, sticky mass is formed at about 300–500° C., and this physical state considerably hinders the continuous circulation of reagents in the furnace, resulting in poor operation; in fact, it is practically impossible to achieve complete reaction and the final product contains some free acid.

To cope with these drawbacks, a process has been proposed in which potassium metaphosphate is prepared at moderate temperature (about 400–500° C.) in a rotary kiln, with the provision of recycling a large quantity of final product. The reaction then takes place on the surface of moving inert particles, thereby avoiding the formation of the sticky phase. However, with this recycling method, the output of the kiln is very low relative to the amount of products in circulation, thereby necessitating high operating expenses which, of course, detract from the technological advantages of the process. (It is also here to be noted that potassium metaphosphate obtained at moderate temperature is always in the water-insoluble form.)

As another approach, it is known that, to avoid the formation of the sticky phase which appears at moderate temperature, potassium metaphosphate can be prepared from phosphoric acid and potassium chloride by a reaction at elevated temperatures, whereby a fluid molten product is obtained. Thus, it has been proposed to work at a temperature higher than 900° C. with concentrated phosphoric acid; but the severe corrosion attack caused by reaction products is such a serious drawback that it has heretofore not been possible to operate this process on an industrial scale.

It has also been suggested to spray a mixture of KCl and phosphoric acid at a very high temperature (above 1300° C.) into the flame of a burner; but the thermal efficiency of the operation is very low and, therefore, the economical value of the process is considerably reduced.

According to still another process, invented by two of the present applicants and described in pending U.S. patent application Ser. No. 345,089, filed Feb. 17, 1964, phosphoric acid and potassium chloride are reacted at the surface of a fused bath consisting essentially of potassium metaphosphate and contained in a tank furnace. The bath is maintained in the range of its melting point (between 560 and 850° C., preferably between 650 and 800° C.) by means of heat supplied partly externally to the liquid bath and partly to the interior of the bath by the Joule effect. In this process, the heating values of the gases leaving the tank furnace are recovered by sending these gases through heat exchangers before sending them to the HCl absorption plant.

As in all elevated temperature processes, the potassium metaphosphate obtained by this above-mentioned process is in the molten form and its water solubility can be varied. It is well known, for example, that molten metaphosphate solidifies in a water-insoluble form when cooled down slowly, whereas it is partially or completely water-soluble when obtained by a more rapid cooling. In this way, various types of fertilizers can be prepared.

The principal object of this invention is to provide an improved process for the production of potassium metaphosphate.

Upon further study of the specifications and claims, other objects and advantages of the present invention will become apparent.

To achieve the objects of this invention, there is provided a process wherein the heat required to cause potassium chloride and phosphoric acid to react is used in such manner that the total thermal efficiency of the operation is considerably improved. Moreover, the final product is in the molten form; therefore, the solid obtained can be more or less water-soluble according to the cooling method selected.

The process of the present invention comprises partly reacting phosphoric acid and potassium chloride in a first step by heating the reaction mixture at a temperature ranging from about 120–300° C., then completing the reaction in a second step by rapidly increasing the temperature of the partly reacted mixture to about 560–850° C., the potassium metaphosphate obtained in the molten form being then cooled until it becomes solid.

This method of operating in two steps at above-given temperatures makes it possible to maintain the reaction mixture in fluid form during the entire duration of the operation; thus, the formation of a sticky phase which would hinder the successful development of the reaction is avoided. Of additional importance is that this method is amenable to continuous operation.

In the operation of the present process, the calories contained in the hot gases coming from the second step are preferably used to supply the total quantity or at least the major part of the heat required for reaction in the first step. In this manner, the gases discharged from the second step are cooled, and their temperature being fairly low, they can be sent directly to the hydrogen chloride absorption unit without any further cooling.

In practice, the phosphoric acid and potassium chloride are introduced together or separately, preferably in the form of a chloride suspension in the acid, into a first enclosure heated at about 120–300° C. For example, this enclosure may be a rotary kiln heated by the gases coming from the second reaction step, and optionally with make-up heat supplied by a burner which allows an easier regulation of the temperature and thereby a better control of the reaction. This first step of the reaction may also be performed in a tank furnace.

When operating within the limits of temperature mentioned hereabove, the reaction yield obtained in the first step (i.e., quantity of KCl transformed relative to initial quantity of KCl) is advantageously comprised between about 20 and 75%, preferably about 50 to 60%, the reaction being all the more rapid and complete when the temperature is higher within these limits. To obtain these yields, the residence time for the reactants ranges between about 15 minutes and 2 hours, preferably between about 30 minutes and one hour.

In industrial practice, it is advantageous to operate at about 200–250° C. so as to obtain a satisfactory reaction yield (about 60–60%) without the reaction lasting too long. As a matter of fact, it is quite possible to work at about 300° C. for the reaction mass is then still fluid, but as this temperature approaches the point of formation of the sticky phase, the operation is more difficult to conduct owing to the risk of thickening or caking which may be caused by any local overheating.

The partly reacted fluid mixture obtained in the first enclosure flows into a second furnace and the gases containing hydrogen chloride evolved during the reaction are sent directly to a usual absorption device for the recovery of an aqueous hydrogen chloride solution which is a valuable by-product.

The fluid mass leaving the first furnace is introduced into a second furnace containing a liquid bath of metaphosphate maintained liquid by heating at a temperature comprised between about 560–850° C. The feeding is carried out in such manner that the temperature of the partly reacted mixture is sharply increased so as to avoid any significant local drop of temperature of the fused bath. This is accomplished by any conventional technique, for example, by introducing directly a relatively small quantity of partly reacted mixture into the bath of liquid metaphosphate contained in the second furnace.

An important feature of this invention is that the reaction mass from the first step is increased in temperature rapidly, and that a sufficiently high rate is employed to substantially obviate any formation of a pasty, sticky phase. Generally speaking, by "rapidly" it is to be understood that a rate of temperature increase of about 0.5 to about 2° C./second is employed.

The second furnace is heated by any suitable means, e.g., either directly by a burner placed between the bath surface and the furnace roof, or by Joule effect using the fused salt as electrical resistance, an electrical voltage being applied between electrodes suitably spaced from one another and immersed in the bath, or by a radiant roof, or by any of these usual means combined. The second furnace may be a tank furnace or a rotary furnace. In this furnace the reaction is completed, the average residence time being at least about 20 minutes, preferably about 40 to 80 minutes, longer times being permissible but unnecessary. The over-all yields are in the range of about 92 to about 98%.

The molten potassium metaphosphate leaving the furnace at high temperature solidifies by cooling according to any suitable method. If the cooling is slow, the final product is water-insoluble. If the cooling is rapid, for example by tapping the molten potassium phosphate on a metal conveyor belt or on a rotary drum, one or the other being water-cooled, a totally water-soluble product may be prepared. The solid metaphosphate is then ground and screened to suitable size for its final uses.

The molten product may also be treated, according to the known method, by spraying it into air so that both cooling and granulating operations are effected simultaneously.

To operate the process of the present invention, there can be used any grade of KCl, such as a commercial grade potassium chloride containing 58–60% $K_2O$, and as the other reactant any phosphoric acid, e.g., orthophosphoric acid prepared by electrothermal or by wet processes, metaphosphoric acid, superphosphoric acid, etc. It is quite obvious that by using an acid having a high $P_2O_5$ content, the amount of water to be removed by evaporation during the operation is lower, and thereby the quantity of heat required to achieve the reaction is also decreased. Hence, an acid having a $P_2O_5$ content higher than 25% is preferably used.

It is known that substantially pure potassium metaphosphate melts at about 800° C. It is also known that the presence of certain compounds, such as potassium chloride, potassium sulfate, metal oxides ($CaO$, $MgO$, $Fe_2O_3$, $Al_2O_3$, $SiO_2$), and metal salts ($CaCl_2$, $MgCl_2$, etc.) reduces this melting point significantly. For example, a mixture of metaphosphate-chloride containing 27% KCl melts at 610° C., and a mixture of metaphosphate-sulfate containing 13% $K_2SO_4$ melts at 660° C.; and by adding to potassium metaphosphate both potassium chloride and sulfate in proportions that the mixture contains 32% KCl and 6% $K_2SO_4$, the melting point decreases down to 560° C. Further in this connection, it is to be noted that the metal oxides which are present as impurities in wet process phosphoric acid are capable of lowering the melting temperature of potassium metaphosphate down to about 700° C. without further addition of adjuvants.

Satisfactory results can, therefore, be achieved with a liquid bath maintained between about 560° C. and 850° C. by varying the composition of the fused salt bath. In practice, it is advantageous to operate with a temperature range of 650–800° C.

The total and relative concentration of nutritive elements in the desired fertilizer determines the composition of the reaction mixture, and as explained above, the operating temperature of the second furnace depends on this composition.

When a fertilizer having the highest possible concentration in nutritive elements is desired, equimolar proportions of acid and chloride are used. In contrast, to prepare a fertilizer having a lower total concentration but a higher $K_2O/P_2O_5$ ratio (for example, about 1), there are several ways of proceeding. By using a mixture of acid-chloride containing a chloride excess, depending on the desired $K_2O/P_2O_5$ ratio, a fertilizer consisting essentially of a mixture of potassium metaphosphate and chloride is obtained. Sulfuric acid may also be added to the raw materials and then a fertilizer containing potassium metaphosphate, potassium sulfate, and optionally some chloride is prepared.

Without further elaboration it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

A mixture of phosphoric acid containing 47.5% $P_2O_5$, 0.15% $SO_3$, 0.12% F, and 2.6% $Na_2O$, and potassium chloride containing 61.3% $K_2O$ and 1.6% $Na_2O$ is prepared in a separate vessel, the proportions of acid and chloride being such that the mixture contains 1 mol of $P_2O_5$ per mol of ($K_2O+Na_2O$).

The slurry is introduced into a rotary kiln heated chiefly by convection-radiation by means of hot gases coming from a high-temperature tank furnace. Any additionally required heat is supplied by a burner, the rate of heat therefrom being easy to control by regulating the fuel feed; thus, the temperature in the kiln can be maintained at about 250° C. The average residence time of the reactants in the kiln is about 1 hour.

When normal operating conditions are reached, the fluid mass is discharged from the rotary kiln to a tank furnace having a rectangular hearth, walls made of silica-alumina bricks, and electro-melted refractory material at the points more susceptible to corrosion. The introduction of the fluid mass is effected in the vicinity of one end of the tank furnace. The latter is externally thermally insulated only on those parts which do not come in contact with the fused bath. At the end of the furnace opposite to the inlet of the fluid mass, a tap-hole is provided to discharge the molten product which overflows from the fused bath, the overflow level determining the depth of the bath.

The major part of the heat is supplied to the tank furnace by a burner placed horizontally between the roof and the surface of the liquid bath at the end where the partly reacted fluid mass is fed. Additional heat is supplied to the bath by applying an electrical voltage between four graphite bars places two by two at each end of the bath and totally immersed therein to prevent them from being too quickly deteriorated by the furnace atmosphere. It is in this tank furnace that the reaction is completed.

For starting up this high-temperature furnace, a fused bath is prepared from previously manufactured potassium metaphosphate, the slurry of chloride and acid being then fed to the fused bath. When normal operating conditions are reached, the bath temperature is maintained at about 750° C. and the hot gases leaving the furnace are sent to the rotary kiln.

After start-up, the above-described installation was operated for 100 hours, and 3095 kg. of potassium metaphosphate were obtained; one portion was left to cool down slowly in the open air, and another portion was cooled quickly by tapping it onto the upper side of a metal conveyor belt, the underside of which was water-cooled.

An average sample of the product obtained contained: 59.95% $P_2O_5$ and 32.60% $K_2O$. The product cooled down slowly is water-insoluble. The quenched product is totally water-soluble.

The samples taken during the operation have shown that the average reaction yield (KCl transformed relative to initial KCl) obtained in the first step (rotary kiln) was about 60%.

Example 2

Using phosphoric acid containing 47.6% $P_2O_5$, 2.7% $Na_2O$, 0.14% F, and 0.17% $SO_3$ and potassium chloride containing 60.85% $K_2O$ and 1.85% $Na_2O$, a substantially equimolar slurry is prepared.

The suspension is fed continuously to a rotary kiln heated chiefly by gases having an average temperature of about 900° C. coming from the second operating step, and by means of an auxiliary burner which make it possible to regulate the temperature so that it is maintained at 240–245° C. during the entire operation, the temperature being measured in the vicinity of the outlet of the kiln.

The samples taken at regular intervals from the fluid mass leaving the kiln show an average yield of about 55–56% of initial KCl introduced in this first step. The residence time of the reactants in the kiln is about 45 minutes.

The fluid mass leaving the rotary kiln is fed continuously onto a fused bath of potassium metaphosphate contained in a tank furnace having a rectangular hearth, heated with a gas burner, and walls made of silica-alumina bricks with electro-melted refractory bricks only where the surface of liquid bath comes in touch with the walls. Externally, the furnace is completely heat insulated.

When normal operating conditions are reached, the bath temperature is maintained at about 705° C., and the hot gases, leaving the furnace at an average temperature of 900° C. are sent to the rotary kiln.

The average production obtained was about 42 kg. per hour. The melted potassium metaphosphate was cooled down moderately and an average sample thereof contained 59.15% $P_2O_5$ (of which 23.75% were water-soluble), 31.45% $K_2O$, 4% $Na_2O$, and 1.8% chlorine.

On leaving the rotary kiln, the gases with an average temperature of 280° C. were sent to a hydrogen chloride absorption device.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of potassium metaphosphate, which process comprises the successive steps of:
   (a) partially reacting phosphoric acid and potassium chloride at about 120–300° C.; and
   (b) introducing the resultant mass from step (a) into a molten bath of metaphosphate, said bath being maintained at a temperature of about 560–850° C. to rapidly increase the temperature of the resultant reaction mass from step (a) to about 560–850° C. to obtain additional potassium metaphosphate, said rapid temperature increase being at a sufficiently high rate to substantially obviate any formation of a pasty, sticky phase.

2. The process of claim 1 wherein step (a) is conducted at about 200–250° C.

3. The process of claim 1 wherein the operating temperature of step (b) is about 650–800° C.

4. The process of claim 1 wherein the operating temperature of step (a) is about 200–250° C., and the operating temperature of step (b) is about 650–800° C.

5. The process of claim 1, further comprising the step of passing hot HCl-containing by-product gas from step (b) in heat exchange with the reactants in step (a).

6. The process of claim 5 wherein the by-product gas, after it has been cooled in heat exchange with the reactants of step (a), is then passed to an HCl-absorption system.

7. The reaction of claim 1 wherein the proportions of phosphoric acid and potassium chloride are substantially equimolar.

8. The reaction of claim 1 wherein the reaction mixture contains an excess of potassium chloride.

9. The process of claim 8 wherein the reaction mixture contains sulfuric acid.

10. The process of claim 1 wherein the phosphoric acid contains at least 25% of $P_2O_5$.

11. A process as defined by claim 1 wherein the rate of temperature increase in step (b) is about 0.5 to about 2 centigrade degrees per second.

12. A process as defined by claim 2 wherein the rate of temperature increase in step (b) is about 0.5 to about 2 centigrade degrees per second.

13. A process as defined by claim 3 wherein the rate of temperature increase in step (b) is about 0.5 to about 2 centigrade degrees per second.

14. A process as defined by claim 4 wherein the rate of temperature increase in step (b) is about 0.5 to about 2 centigrade degrees per second.

15. A process as defined by claim 1 wherein said potassium chloride in step (a) is reacted to the extend of about 20–75%, and that the reaction time of step (a) is about between 15 minutes and 2 hours.

16. A process as defined by claim 11 wherein said potassium chloride in step (a) is reacted to the extent of about 20–75%, and that the reaction time of step (a) is about between 15 minutes and 2 hours.

17. A process as defined by claim 14 wherein said potassium chloride in step (a) is reacted to the extent of about 20–75%, and that the reaction time of step (a) is about between 15 minutes and 2 hours.

18. A process as defined by claim 1 wherein said potassium chloride in step (a) is reacted to the extent of about 50–60%, and that the reaction time of step (a) is about between 30 minutes and 1 hour.

19. A process as defined by claim 14 wherein said potasseium chloride in step (a) is reacted to the extent of about 50–60%, and that the reaction time of step (a) is about between 30 minutes and 1 hour.

20. A process for the production of potassium metaphosphate, which process comprises the successive steps of:

(a) partially reacting phosphoric acid and potassium chloride at about 120–300° C.;
(b) introducing the resultant reaction mass from step (a) into a molten bath of metaphosphate, said bath being maintained at a temperature of about 560–850° C. to rapidly increase the temperature of the resultant reaction mass from step (a) to about 560–850° C. to obtain additional potassium metaphosphate, said rapid temperature increase being at a sufficiently high rate to substantially obviate any formation of a pasty, sticky phase; and
(c) passing hot HCl-containing by-product gas from step (b) in heat exchange with the reactants in step (a).

21. The process of claim 20 wherein the by-product gas, after it has been cooled in heat exchange with the reactants of step (a), is then passed to an HCl-absorption system.

References Cited

FOREIGN PATENTS

| | | |
|---|---|---|
| 832,011 | 4/1960 | Great Britain. |
| 1,357,727 | 3/1964 | France. |

OSCAR R. VERTIZ, *Primary Examiner.*

H. S. MILLER, *Assistant Examiner.*